UNITED STATES PATENT OFFICE.

WALTER ROBINSON, OF SYRACUSE, NEW YORK.

WALL-PLASTER.

SPECIFICATION forming part of Letters Patent No. 472,511, dated April 5, 1892.

Application filed July 6, 1891. Serial No. 398,597. (No specimens.)

*To all whom it may concern:*

Be it known that I, WALTER ROBINSON, of Syracuse, in the county of Onondaga, in the State of New York, have invented new and useful Improvements in Wall-Plaster, of which the following, taken in connection with the accompanying drawings, is a full, clear, and exact description.

My invention relates to wall-plaster.

My object is to produce a composition for plaster or cement for architectural purposes which will dry rapidly and become hard, and at the same time retain sufficient elasticity to prevent it from cracking and present a smooth and glossy surface when finished.

My invention consists in mixing and commingling several novel ingredients, as hereinafter described.

In carrying out my invention I mix and commingle together the following ingredients in substantially the following proportions: To two hundred and fifteen pounds of sand I add seventy pounds plaster-of-paris, twenty pounds of clay, (which has been thoroughly dried and pulverized,) fifteen pounds of lime, twelve ounces of glue, one ounce of alum, and eight ounces of starch, to which may be added hair or other tissue matter in any quantity desired.

I have ascertained by practice that by mixing the aforesaid materials together with lime a hard finish is produced, the glue and starch acting to retard the compound, while the alum serves to make the entire composition after it has been applied harder and tougher. These ingredients are thoroughly mixed and commingled together in a dry condition and put up in packages for transportation, and when it is desired for use the compound is mixed with sufficient water to make the same plastic and pliable.

The above proportions are substantially true and correct to all intents and purposes.

What I claim is—

Wall-plaster consisting of sand, plaster-of-paris, glue, lime, clay, alum, and starch.

In witness whereof I have hereunto set my hand this 27th day of June, 1891.

WALTER ROBINSON.

In presence of—
HOWARD P. DENISON,
C. B. KINNE.